United States Patent [19]

Montgomery et al.

[11] Patent Number: 4,824,879
[45] Date of Patent: Apr. 25, 1989

[54] LOW SHRINKAGE TAPE JOINT COMPOSITION CONTAINING ATTAPULGITE

[75] Inventors: Richard L. Montgomery, Woodbury; Donald L. Robertson, Eagan, both of Minn.

[73] Assignee: Minnesota Mining and Manufacturing Company, Saint Paul, Minn.

[21] Appl. No.: 127,520

[22] Filed: Nov. 27, 1987

Related U.S. Application Data

[63] Continuation-in-part of Ser. No. 876,753, Jun. 20, 1986, abandoned.

[51] Int. Cl.⁴ .................................................. C08L 1/26
[52] U.S. Cl. .......................................... 524/43; 524/44
[58] Field of Search ............................... 106/193, 214; 524/43–45, 5

[56] References Cited

U.S. PATENT DOCUMENTS

| | | | |
|---|---|---|---|
| 3,297,601 | 1/1967 | Maynard et al. | 524/5 |
| 3,303,147 | 2/1967 | Elden | 524/5 |
| 3,808,017 | 4/1974 | Bath | 106/214 |
| 3,835,074 | 9/1974 | Desmarais | 524/44 |
| 3,891,582 | 6/1975 | Desmarais | 524/44 |
| 3,900,434 | 8/1975 | Bruchtein et al. | 524/44 |
| 4,558,079 | 12/1985 | Desmarais | 524/43 |

*Primary Examiner*—Theodore Morris
*Attorney, Agent, or Firm*—Donald M. Sell; Walter N. Kirn; Richard E. Brink

[57] ABSTRACT

The shrinkage of tape joint compounds, which normally comprise water, filler, and binding resin, is significantly reduced by minimizing the amount of water-absorbing materials such as attapulgite and hydroxyethyl cellulose. Comparable improvements can be made to spachtling compounds.

7 Claims, No Drawings

LOW SHRINKAGE TAPE JOINT COMPOSITION CONTAINING ATTAPULGITE

CROSS REFERENCE TO RELATED APPLICATION

This application is a continuation-in-part of copending application Ser. No. 876,753, filed June 20, 1986 now abandoned.

BACKGROUND OF THE INVENTION

This invention relates to tape joint compounds and spachtling (or spackling) compounds and is especially concerned with compositions having low shrinkage upon drying.

During installation, gypsum board surfaces frequently develop cracks, pits, etc. When gypsum board is mounted, there are inevitably dimples at the location where individual sheets are nailed or screwed to studs or ceiling joists. A strip of perforated tape is commonly applied over the indented adjacent edges of a space between adjoining gypsum board panels, spreadable joint filling composition (commonly called "compound") being applied both under and over the tape and allowed to dry or cure.

Even if the original gypsum board or plaster installation is substantially free of defects, shrinkage or uneven settling is likely to cause cracks at a later time. When pictures are moved from one location to another, nail holes remain at the first location. Flaws of these type are typically repaired with spachtling compound, which is a spreadable composition that is similar to, but somewhat "dryer" than, tape joint compound, which is applied and similarly allowed to dry or cure.

Both tape joint compounds and spachtling compounds include polymeric binder, filler, and water, but also typically include preservatives, water-retention agents, wetting agents, defoamers, plasticizers, non-leveling agents, etc. The density of such compositions can be reduced by incorporating expanded perlite or hollow glass microspheres, the latter sometimes being referred to as glass microbubbles; see, e.g., U.S. Pat. Nos. 3,183,107, 3,386,223, 4,086,098, 4,391,647, and 4,454,267.

Because it is necessary for tape joint compositions to include enough water to permit them to be readily and smoothly applied with a spatula or trowel, a substantial amount of shrinkage typically results during drying. It is thus generally necessary to apply such compositions in several separate thin coats, sanding at least after the last coat has dried, in order to avoid leaving a disfiguring depression where the joint has been filled. For example, when filling taped joints between abutted gypsum board panels, it is usually necessary to apply three coats of a joint filling composition having a shrinkage of 30-40%, drying and preferably sanding between applications. Certain premium compositions having a shrinkage of 20-30% may require only two applications, but it is believed that no previous composition would yield satisfactory results in a single application. Since all joint filling operations are highly labor intensive (typically labor costs amount to about 90% of the cost of the project), the total cost has been extremely high when compared to the cost of the composition employed, and the advantages of a one-pass compound appear to be obvious. Interestingly, however, both manufacturers and purchasers profess to be extremely concerned about the cost of the compositions, and no such one-pass compound has been available; indeed, it is believed that no one recognized how to make such a composition.

Manufacturers of joint filling compositions formerly included asbestos fibers to impart the non-sagging properties considered essential to a successful product. When asbestos was recognized as a carcinogen, manufacturers turned to more innocuous substitutes to impart the same properties. In the absence of asbestos, attapulgite (a micronized swelling or gelling clay having a fibrous crystalline structure and a high oil absorbence; cf. U.S. Pat. Nos. 3,907,725 and 4,454,627), thickeners (e.g., cellulose ethers such as hydroxypropyl methyl cellulose or hydroxyethyl cellulose; cf. U.S. Pat. No. 4,454,627; starch; precipitated or fumed silica), and adjuvants such as gelling agents and flow control agents became typical ingredients in joint filling compositions. These additives—especially the attapulgite and cellulose ethers, which adsorb a substantial amount of water and impart thixotropic and non-sagging properties to the finished composition and which are present in substantial amounts—unfortunately have also made it impossible to achieve a spreadable composition having low water content. As a result, prior art compositions have been subject to significant shrinkage (up to about 50%), making it necessary to apply more than one coat (typically three coats, as previously noted) to achieve an acceptable appearance.

SUMMARY OF THE INVENTION

The present invention provides joint filling compositions that have extremely low shrinkage while still possessing desirable attributes of easy application and resistance to sagging. Satisfactory filling can be effected in two applications, and often in a single application, dramatically reducing labor cost. Because the compositions of the invention contain a higher volume percentage of relatively high density solid material than prior art compositions, the weight per unit volume of the least expensive compositions is somewhat higher; density can, of course, be reduced by incorporating hollow fillers such as expanded perlite or, preferably, hollow glass microspheres, as part of the solid material, albeit at some increase in the cost of raw materials.

The present invention is based on the deceptively simple discovery that prior art joint filling compositions can be significantly improved and shrinkage drastically reduced by minimizing the volume percentage of water-adsorbing additives such as the conventionally included attapulgite and hydroxyethyl cellulose, thereby obtaining compositions having lower water content than has heretofore been considered possible. Although the shrinkage is reduced, the handling and non-sagging properties of the prior art compositions are retained. Simple and logical though the invention may seem in retrospect, it flies in the face of what has been "known" by those skilled in the art.

Compositions of the invention exhibit shrinkage upon drying of no more than about 25%, preferably no more than about 20%, and still more preferably no more than about 10%. This decreased shrinkage significantly reduces the need for additional coatings, even where the area to be filled is deep or extensive, and thereby greatly lowers labor cost.

Compositions of the present invention are significantly more nearly Newtonian than those of the prior art. If, for example, viscosity is measured at room temperature on a Brookfield Model RVT Viscometer using spindle "4" at 0.5 rpm and 1 rpm, the viscosity difference in poises (known as the "Brookfield yield value") would be 0 for a completely Newtonian liquid, more plastic fluids having much higher values. To demonstrate clearly the difference between prior art compositions and those of the present invention, 250 cc of water is added to 500 cc of the composition to be tested, mixed until smooth and the diluted composition allowed to stand for 30 minutes before performing yield value measurements. When evaluated in accordance with this test, conventional tape joint compositions exhibit what will be referred to herein as "diluted yield values" on the order of 250–500 poises (25–50 Pa.s), while compositions of the present invention generally have diluted yield values on the order of 10–100 poises (1–10 Pa.s) or somewhat less (e.g., 5 poises, or 0.5 Pa.s) and in no event exceed 150 poises (15 Pa.s).

The invention may thus be characterized as an improved tape joint or wall repair composition comprising particulate filler, binder, water and optionally adjuvant substances, typically having a viscosity on the order of 2,000–3,000 Pa.s when measured on a Brookfield RVT Viscometer with Helipath, Spindle F, at 5 rpm. The improvement resides in reducing the amount of water-adsorbing materials to ensure that the diluted yield value of the composition is on the order of 1–10 Pa.s (in no event greater than about 15 Pa.s) whereby the composition is readily spreadable and resists sagging but shrinks substantially less upon drying than do conventional compounds having a diluted yield value on the order of 25–50 Pa.s.

DETAILED DESCRIPTION

To perform careful measurements of the amount of shrinkage resulting from the use of a given wall repair composition, it was found necessary to devise a more precise test than the highly qualitative and subjective evaluations presently used in the tape joint compound industry. This procedure will now be described.

A reusable mold, formed from RTV silicone, so as to provide a cavity approximately 2 cm×2 cm×20 cm, is weighed. A Fisher Grease Pycnometer is then used to determine the density of each joint compound to be tested, after which the mold cavity is filled with the compound and the sample-filled mold weighed. The volume of the joint compound in the mold is calculated by subtracting the weight of the empty mold from the weight of the compound-filled mold and dividing the result by the density of the composition. The sample is then dried at room temperature until a constant weight is achieved, typically 48 hours, after which it is carefully removed from the mold and weighed. All six faces of the dried sample are then sealed with hair spray and allowed to dry, minimizing any water absorption in the subsequent volume displacement test.

Water is added to a tared 100 ml graduated cylinder until the bottom of the meniscus reaches the 100 ml mark. The water-filled cylinder is reweighed and the tare weight subtracted, yielding the true volume of the cylinder, based on an assumed 1.0 g/ml density for water. The cylinder is then emptied and dried, the sealed and dried sample placed in it, and the cylinder plus sample tared. Water is then added until the meniscus is even with the 100 ml mark, tapping the cylinder from time to time to make certain that no air bubbles cling to the surface of the sample. For any sample having a density of less than that of water, an eye dropper is employed to push the sample just below the surface of the water before reading the meniscus. The weight of the water added is then determined and subtracted from the weight of water previously required to fill the empty cylinder, thereby arriving at the volume of the dried sample. The percentage shrinkage is then calculated as follows:

Percentage shrinkage =

$$100 \times \frac{\text{(wet sample volume)} - \text{(dry sample volume)}}{\text{(wet sample volume)}}$$

Tape joint compounds are generally classified as either "heavy weight" or "light weight", the filler in the former constituting only solid particulate inorganic material and the filler in the latter including hollow glass microspheres or other cellular material. As a general rule, heavy weight compounds shrink about 30–50%, while light weight compounds shrink about 20–30%.

Tabulated below are a variety of tape joint compounds, Table I listing the compositions and Table II listing certain physical properties of the compositions. In preparing these formulations the attapulgite and "Tamol" dispersant were vigorously mixed with approximately half of the water, using an air motor and a high shear mixer so as to thoroughly disperse the clay. This dispersion was combined with the polyvinyl acetate (supplied as an aqueous emulsion) and preservative, using a Ross double planetary mixer, Model LOM-2. The remaining dry ingredients were blended by hand and added to the planetary mixer. The ingredients were then mixed for 5 minutes, adding just enough water to provide a stiff but fluid mass. After the sides of the mixing vessel had been scraped down, the remaining additional water was added to obtain the desired viscosity, on the oder of 2000–3000 Pa.s.

Example 1 is a typical all-purpose tape joint formulation, having a typical 38% shrinkage. Example 2 shows that by the simple but unobvious expedient of reducing the amount of water-adsorbing attapulgite from 1.8 volume percent to 0.5 volume percent, shrinkage was reduced from 38% to 23%. Example 3 shows that including a small amount of hollow glass microspheres (which have relatively low surface area per unit volume) and reducing the amount of hydroxyethyl cellulose from 0.9 volume percent to 0.3 volume percent reduces shrinkage still further, i.e., to 14%.

Examples 4 and 5 show that the shrinkage of "light weight" tape joint compounds can be similarly decreased by minimizing water-adsorbing additives, Example 4 being illustrative of a conventional composition and Example 5 being a composition of the present invention.

Formulations 2, 3, and 5, which exemplify compositions of the invention, were evaluated by professional tape joint applicators and found to have all the normal handling properties of typical prior art composition formulations 1 and 4, as well as commercial compositions "A", "B", and "C". In addition, however, it was determined that formulations 2, 3, and 5 possessed substantially lower shrinkage than prior art compositions.

TABLE I

Compositions Showing Effect of Varying Volume Percentages Of Certain Components

| Example | (Comparative) 1 WT % | (Comparative) 1 VOL % | 2 WT % | 2 VOL % | 3 WT % | 3 VOL % | (Comparative) 4 WT % | (Comparative) 4 VOL % | 5 WT % | 5 VOL % | COMMERCIALLY AVAILABLE COMPOUNDS ALL PURPOSE "A" | COMMERCIALLY AVAILABLE COMPOUNDS LT. WEIGHT "B" | COMMERCIALLY AVAILABLE COMPOUNDS LT. WEIGHT "C" |
|---|---|---|---|---|---|---|---|---|---|---|---|---|---|
| Polyvinyl Acetate* | 1.8 | 2.6 | 1.8 | 3.1 | 1.9 | 3.0 | 3.1 | 3.0 | 3.0 | 2.9 | | | |
| "Scotchlite" Glass Bubbles | — | — | — | — | 0.51 | 6.0 | — | — | — | — | | | |
| Expanded Perlite | — | — | — | — | — | — | 6.6 | 29.0 | 7.6 | 33.8 | | | |
| Attapulgite | 2.65 | 1.8 | 0.7 | 0.5 | 0.68 | 0.5 | 2.1 | 0.9 | 1.0 | 0.4 | | | |
| Hydroxyethyl-cellulose | 0.35 | 0.8 | 0.4 | 0.9 | 0.12 | 0.3 | 0.4 | 0.6 | 0.2 | 0.3 | | | |
| Calcium Carbonate | 50.0 | 29.9 | 60.5 | 34.6 | 70.0 | 45.4 | 27.2 | 10.6 | 40.0 | 16.0 | | | |
| "Nuosept" 95 | 0.01 | 0.0003 | 0.01 | 0.0003 | 0.01 | 0.0003 | 0.01 | 0.0003 | 0.1 | 0.0003 | | | |
| "Tamol" 850 | 0.55 | 1.4 | 0.5 | 0.9 | 0.34 | 0.5 | 0.5 | 0.4 | 0.2 | 0.2 | | | |
| Talc | 4.5 | 2.8 | 4.3 | 3.1 | 0 | 0 | 5.4 | 2.0 | 0 | 0 | | | |
| Mica | 3.1 | 1.8 | 1.5 | 1.0 | 1.6 | 1.0 | 6.2 | 2.5 | 5.9 | 2.4 | | | |
| Water | 37.1 | 58.9 | 30.0 | 55.8 | 24.8 | 43.3 | 48.7 | 51.0 | 41.5 | 44.0 | | | |
| Density, g/cc | | 1.6 | | 1.7 | | 1.8 | | 1.0 | | 1.1 | 1.7 | 1.3 | 1.4 |

*Supplied as 40% aqueous emulsion; figure reported is actual resin solids, the water being included as part of the separately listed "water"

TABLE II

Physical Properties of Compositions Listed in Table I

| Example | (Comparative) 1 | 2 | 3 | (Comparative) 4 | 5 | COMMERCIALLY AVAILABLE COMPOUNDS ALL PURPOSE "A" | COMMERCIALLY AVAILABLE COMPOUNDS LT. WEIGHT "B" | COMMERCIALLY AVAILABLE COMPOUNDS LT. WEIGHT "C" |
|---|---|---|---|---|---|---|---|---|
| Viscosity, Brookfield RVT with Helipath, Spindle "F", 5 RPM Pa.s | 2800 | 2600 | 2800 | 2600 | 3000 | 2700 | 2000 | 2700 |
| Shrinkage, % | 38 | 23 | 14 | 31 | 10 | 37 | 20 | 31 |
| Diluted yield value, Pa.s | 32 | 8.6 | 8 | 35 | 7.0 | 52 | 26 | 32 |

Because of their greater density, heavy weight compounds (density of 1.5–2.0 g/cc) require a somewhat greater amount of attapulgite and/or cellulose ethers to prevent sagging than light weight compounds (density in the range of 0.6–1.5 g/cc). In accordance with the invention, however, it has been learned that a total of 1.5 volume percent is adequate for heavy weight compounds having a density of 1.7 and as little as 0.5 volume percent for light weight compounds having a density of 1.0, with up to 1.0 volume percent being preferred where the density is 1.5. In any event, shrinkage is inversely related to the total volume percent of these two ingredients in the compound.

We claim:

1. In a ready-mix tape joint or wall repair compound of the type that hardens by drying comprising particular filler, binder, and water, the improvement wherein said composition has a diluted yield value no greater than about 15 Pa.s, whereby said composition is readily spreadable and resists sagging but shrinks no more than about 25% upon drying.

2. The compound of claim 1 wherein the diluted yield value is at least 0.5 Pa.s.

3. The compound of claim 1 wherein the viscosity of the compound is on the order of 2,000–3,000 Pa.s.

4. The compound of claim 3 wherein the diluted yield value is on the order of 1–10 Pa.s.

5. The compound of claim 4 wherein shrinkage upon drying is no more than about 20%.

6. The compound of claim 4 wherein shrinkage upon drying is no more than about 10%.

7. The compound of claim 4 wherein hollow glass microspheres make up a portion of the filler solids.

* * * * *